US012583390B2

(12) United States Patent
Lee et al.

(10) Patent No.: US 12,583,390 B2
(45) Date of Patent: Mar. 24, 2026

(54) CAMERA DEVICE

(71) Applicant: LG INNOTEK CO., LTD., Seoul (KR)

(72) Inventors: Min Woo Lee, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 109 days.

(21) Appl. No.: 18/564,372

(22) PCT Filed: May 28, 2022

(86) PCT No.: PCT/KR2022/007618
§ 371 (c)(1),
(2) Date: Nov. 27, 2023

(87) PCT Pub. No.: WO2022/250509
PCT Pub. Date: Dec. 1, 2022

(65) Prior Publication Data
US 2024/0253567 A1 Aug. 1, 2024

(30) Foreign Application Priority Data
May 28, 2021 (KR) ........................ 10-2021-0069562

(51) Int. Cl.
B60R 1/28 (2022.01)
H04N 23/54 (2023.01)
(Continued)

(52) U.S. Cl.
CPC .............. B60R 1/28 (2022.01); H04N 23/54 (2023.01); H04N 23/55 (2023.01); H04N 23/57 (2023.01)

(58) Field of Classification Search
CPC ... B60R 1/28; B60R 11/04; B60R 2011/0026; F16M 11/10; F16M 11/18; F16M 13/02;
(Continued)

(56) References Cited

U.S. PATENT DOCUMENTS 12,035,023 B2 * 7/2024 Kim ..................... H04N 23/695
2002/0003571 A1 * 1/2002 Schofield ................ B60C 23/00
348/148
(Continued)

FOREIGN PATENT DOCUMENTS

KR 10-0661051 B1 12/2006
KR 10-2011-0107536 A 10/2011
(Continued)

OTHER PUBLICATIONS

International Search Report dated Sep. 13, 2022 in International Application No. PCT/KR2022/007618.
(Continued)

*Primary Examiner* — Amy R Hsu
(74) *Attorney, Agent, or Firm* — SALIWANCHIK, LLOYD & EISENSCHENK

(57) ABSTRACT

This camera device comprises: a moving part including a lens; a fixed part coupled to the moving part; and a control part for controlling the movement of the moving part. The control part includes a control member and a body, wherein the body includes: a base; a first side wall extending from the base and contacting the fixed part; and a second side wall extending from the base and contacting the moving part.

18 Claims, 5 Drawing Sheets

(51) Int. Cl.
    *H04N 23/55*        (2023.01)
    *H04N 23/57*        (2023.01)
(58) Field of Classification Search
    CPC ...... G03B 17/561; G03B 30/00; G03B 37/04;
               H04N 23/54; H04N 23/55; H04N 23/57
    See application file for complete search history.

(56)               References Cited

U.S. PATENT DOCUMENTS

2012/0233841 A1*   9/2012  Stein .................... G03B 17/561
                                       396/428
2016/0318458 A1*  11/2016  Wato ...................... H04N 23/51
2021/0368074 A1*  11/2021  Morais Bicudo ...... H04N 23/58

FOREIGN PATENT DOCUMENTS

| | | |
|---|---|---|
| KR | 10-2016-0071031 A | 6/2016 |
| KR | 10-2016-0092819 A | 8/2016 |
| KR | 10-2018-0053077 A | 5/2018 |
| KR | 10-2019-0029317 A | 3/2019 |
| KR | 10-2020-0036487 A | 4/2020 |
| WO | 2020/145664 A1 | 7/2020 |

OTHER PUBLICATIONS

Supplementary European Search Report dated May 15, 2025 in
European Application No. 22811700.8.

* cited by examiner

CAMERA DEVICE

CROSS-REFERENCE TO RELATED APPLICATIONS

This application is the U.S. national stage application of International Patent Application No. PCT/KR2022/007618, filed May 28, 2022, which claims the benefit under 35 U.S.C. § 119 of Korean Application No. 10-2021-0069562, filed May 28, 2021, the disclosures of each of which are incorporated herein by reference in their entirety.

TECHNICAL FIELD

The present embodiment relates to a camera device.

Background Art

Recently, a subminiature camera module has been developed, and the miniature camera module is widely used in small electronic products such as smart phones, laptop computers, and game consoles.

As the spread of automobiles has become popular, subminiature cameras are widely used not only in small electronic products but also in vehicles. For example, black box cameras for vehicle protection or objective data on traffic accidents, rear surveillance cameras enabling the driver to monitor blind spots at the rear of the vehicle through a screen to ensure safety when reversing the vehicle, ambient detection cameras capable of monitoring the surroundings of the vehicle, and the like are provided.

Meanwhile, with the advancement of technology, there is a trend of applying a lane keeping assist system (LKAS), which receives video signals from the road ahead and analyzes them in real time and detects lane departure situations caused by the driver's carelessness or drowsy driving to generate an alarm by receiving the signals.

However, due to differences in vehicle size and wind glass angle for each vehicle, a separate coupler, and the like must be used for each vehicle to optimize the angle of view for the camera for the lane keeping assist system, and accordingly, there is a problem that the cost of the mold is incurring.

DETAILED DESCRIPTION OF THE INVENTION

Technical Subject

The present embodiment is intended to provide a camera device that can reduce manufacturing costs and adjust the angle of view to a beam angle within a desired range.

In addition, it is intended to provide a camera device that can easily adjust the angle of view to a beam angle within a desired range even after mounting.

Technical Solution

A camera device according to the present embodiment comprises: a moving part including a lens; a fixed part being coupled to the moving part; and a control part for controlling the movement of the moving part, wherein the control part includes a control member and a body, and wherein the body includes: a base; a first side wall being extended from the base and being in contact with the fixed part; and a second side wall being extended from the base and being in contact with the moving part.

The control part includes an elastic member disposed between the moving part and the fixed part, and the elastic member includes a first region in contact with the moving part and a second region in contact with the fixed part, and the first region and the second region may be at least partially separated from each other.

When the gap between the base of the body and the fixed part becomes smaller, the gap between the first region and the second region of the elastic member may become smaller.

The gap between the moving part and the fixed part can be adjusted by the gap between the first region and the second region of the elastic member.

The base may include a first hole into which the control member is inserted, and the fixed part may include a second hole into which the control member is inserted.

Each of the angle formed by the base and the first side wall and the angle formed by the base and the second side wall may be an obtuse angle.

When the gap between the base of the body and the fixed part becomes smaller, an optical axis of the lens may be tilted to one direction from a reference point.

When the gap between the base of the body and the fixed part increases, an optical axis of the lens is tilted from a reference point to the other direction.

It may include a control unit that controls the control part.

A camera device according to another embodiment comprises: a moving part including a lens; a fixed part being coupled with the moving part; and a control part that adjusts the movement of the moving part, wherein the control part includes an elastic member and a body, and wherein an optical axis of the lens is tilted in one direction or the other direction from a reference point when the body moves in a direction perpendicular to the optical axis of the lens.

Advantageous Effects

Through the present embodiment, it is possible to provide a camera device that can adjust the angle of view to a beam angle within a desired range.

In addition, it is possible to provide a camera device that can minimize changes in angle of view due to manufacturing tolerances of the camera module or tolerances that occur during mounting on a vehicle.

In addition, it is possible to provide a camera device that can minimize changes in angle of view caused by external forces or vibration during the installation process or after installation on a vehicle.

In addition, it is possible to provide a camera device that can readjust the angle of view being changed due to external forces after mounted on a vehicle.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
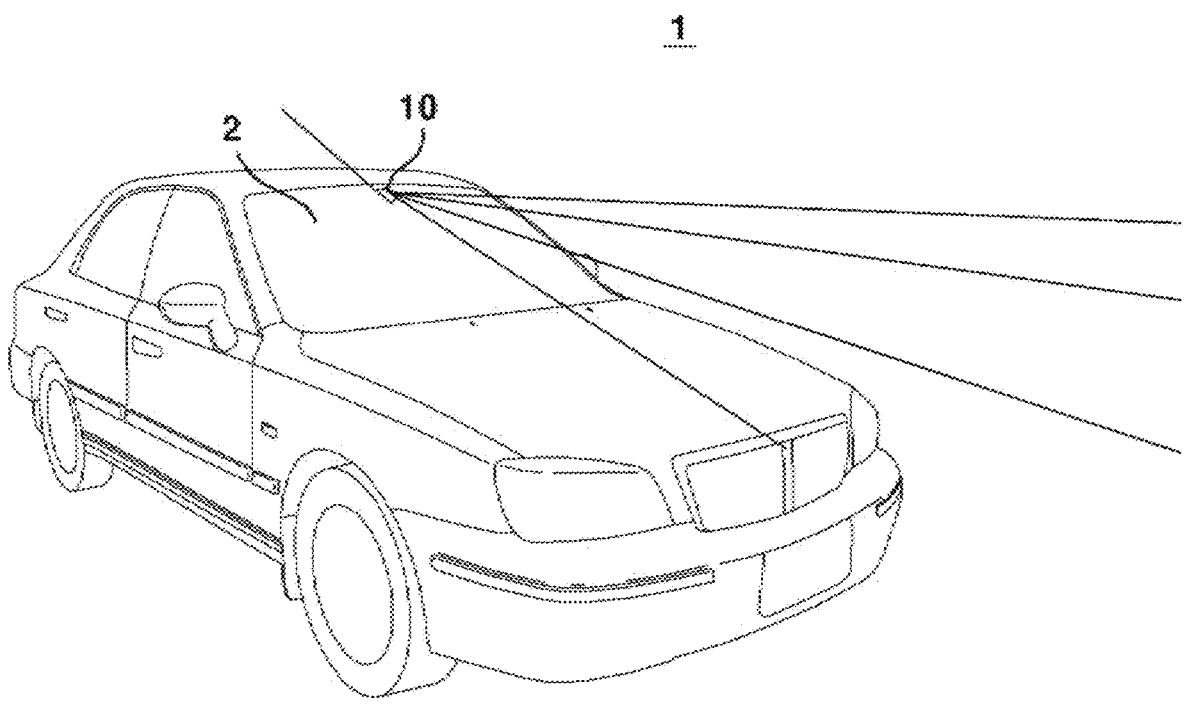
FIG. 1 is a schematic diagram of a vehicle installed with a camera device according to an embodiment of the present invention.

FIG. 1 is a schematic diagram of a vehicle installed with a camera device according to an embodiment of the present invention.

Referring to FIG. 1, the camera device 10 according to an embodiment of the present invention may be coupled to a wind glass 2 of the vehicle 1. The wind glass 2 may be disposed in the front or rear of the vehicle 1. The wind glass 2 is made of a transparent material and allows the driver to look ahead or behind. The wind glass 2 may include a front wind glass being disposed in the front of the vehicle 1 and a rear wind glass disposed at the rear of the vehicle. The camera device 10 may be coupled to an inner surface of the wind glass 2. In an embodiment of the present invention, the camera device 10 is described as being coupled to the front wind glass as an example, but may also be coupled to the rear wind glass. A bracket 200 (see FIG. 2) of the camera device 10 may be directly coupled to an inner surface of the wind glass 2 by adhesive or other methods, but it is not excluded that the camera device 10 is coupled to the wind glass 2 through a separate coupler (not shown) and/or a cover (not shown).

Figure 2:
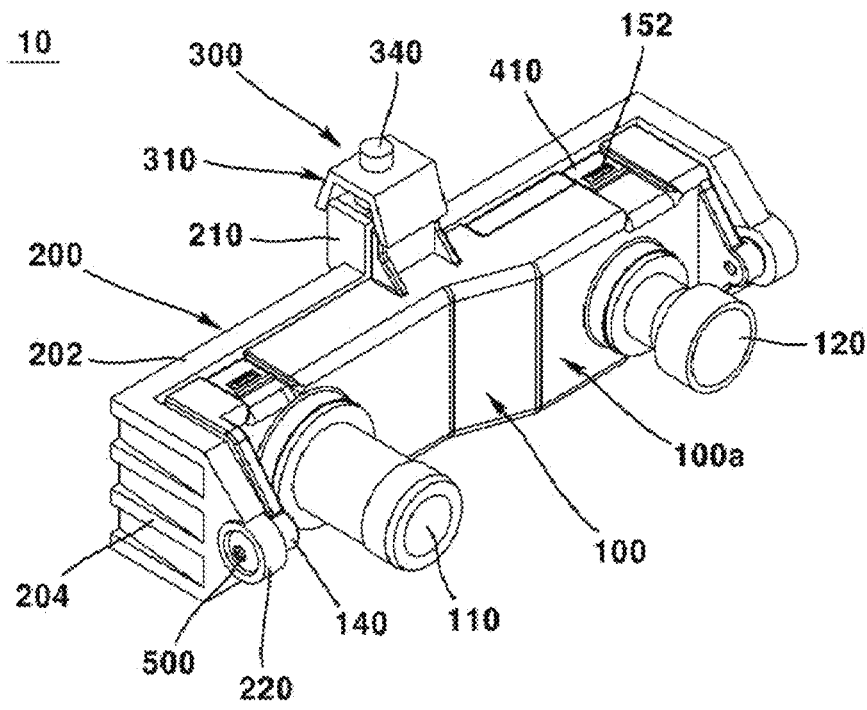
FIG. 2 is a perspective view illustrating the appearance of a camera device according to an embodiment of the present invention.
Figure 3:
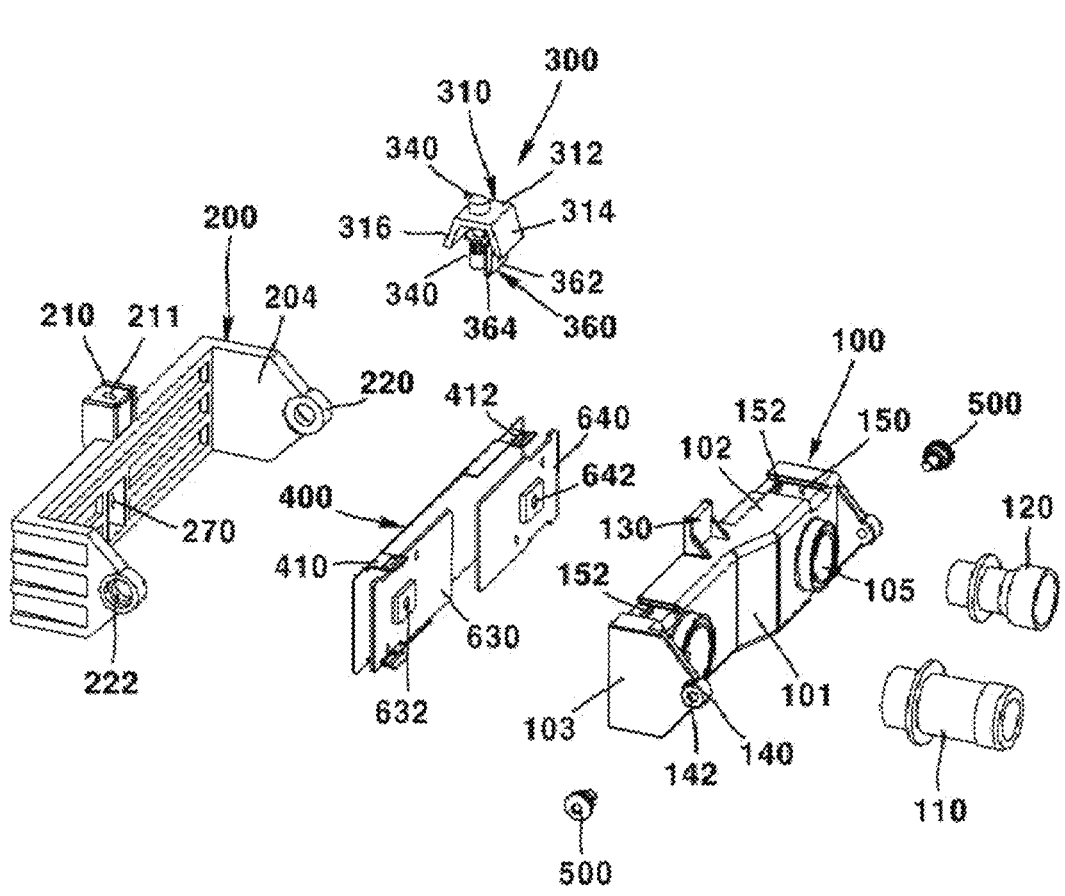
FIG. 3 is an exploded perspective view of a camera device according to an embodiment of the present invention.
Figure 4:
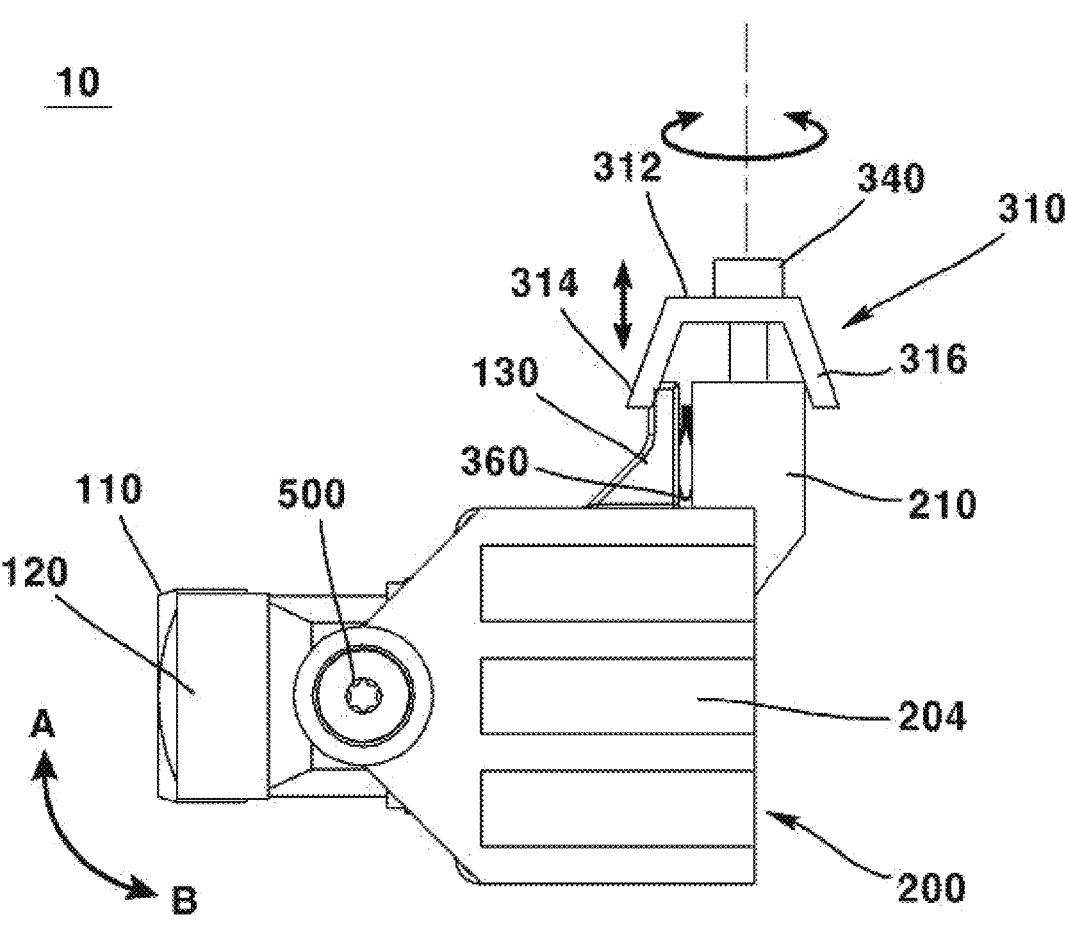
FIG. 4 is a plan view illustrating a side surface of a camera device according to an embodiment of the present invention.
Figure 5:
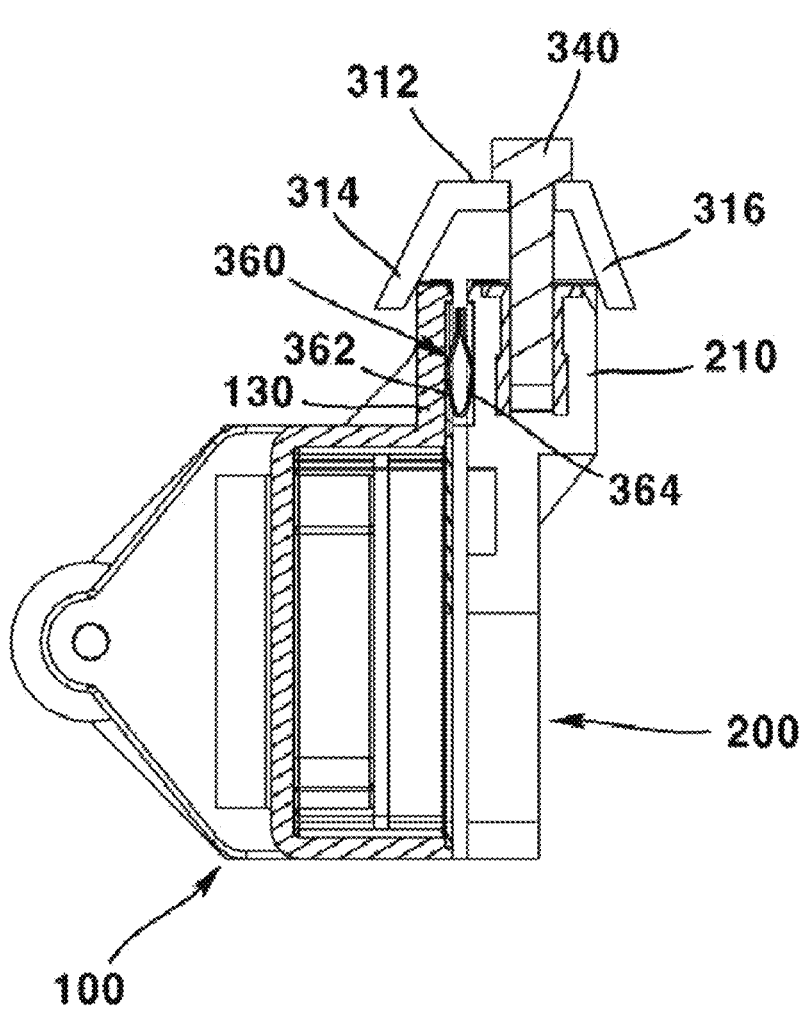
FIG. 5 is a cross-sectional view of a camera device according to an embodiment of the present invention.

FIG. 2 is a perspective view illustrating the appearance of a camera device according to an embodiment of the present invention; FIG. 3 is an exploded perspective view of a camera device according to an embodiment of the present invention; FIG. 4 is a plan view illustrating a side surface of a camera device according to an embodiment of the present invention; and FIG. 5 is a cross-sectional view of a camera device according to an embodiment of the present invention.

Referring to FIGS. 2 to 5, a camera device 10 according to an embodiment of the present invention may include a moving part 100, a fixed part 200, a control part 300, and a plate 400, but it may be implemented excluding some of these components, and additional components other than these are not excluded.

The camera device 10 may be installed on the wind glass 2 of the vehicle 1. The camera device 10 can adjust the photographing direction of the moving part 100. Through this, the angle of view can be adjusted within the range of the beam angle desired by the user by compensating for manufacturing tolerances of the moving part 100 or mounting tolerances on the vehicle 1.

The camera device 10 may include a moving part 100. The moving part 100 may also be called a housing 100 in that it forms the outer appearance of the camera device 10. The moving part 100 may include at least one or more lenses 110 or 120. In the present embodiment, the camera device 10 is described as an example of a dual camera, but it is not limited to this and can be modified in various ways, such as a triple camera.

The lenses 110 and 120 include a first lens 110 and a second lens 120, and may be disposed in front of the moving part 100. A mounting part 105 to which the first lens 110 and the second lens 120 are coupled may be disposed on the front of the housing 100a that forms the external shape of the moving part 100. The mounting part 105 has a shape of an opening and may include a first mounting part to which the first lens 110 is coupled and a second mounting part to which the second lens 120 is coupled. The front of the housing 100a has a plurality of regions being disposed to be stepped from each other, and the first mounting part and the second mounting part may be disposed in each of the plurality of regions.

Meanwhile, in the present embodiment, the lenses 110 and 120 are examples of the lenses themselves, but this is not limited. The lenses 110 and 120 may be lens barrels, and at least one or more lenses may be disposed inside the lens barrel.

The housing 100a may include: a front surface portion 101 on which the mounting portion 105 is formed, an upper surface portion 102 forming an upper surface, and a side surface portion 103 being disposed on both side surfaces of the front portion 101 and forming a side surface. The front end of the side portion 103 may be formed to be protruded forward from the front portion 101, and a first coupling portion 140 for coupling with the fixed part 200 may be disposed at the front end of the side surface portion 103. The first coupling portion 140 includes a first coupling hole 142 and may be hinge-coupled to the fixed part 200. The moving part 100 may be rotated about the first coupling hole 142. Accordingly, the angle of view of the camera device 10 can be adjusted.

A space in which at least one electronic component is disposed may be formed at the rear of the housing 100a. For example, at the rear of the housing 100a, a first printed circuit board 630 having a first image sensor 632 being disposed to face the first lens 110 in an optical axis direction, and a second printed circuit board 640 having a second image sensor 642 being disposed to face the second lens 120 in an optical axis direction may be placed. The first printed circuit board 630 and the second printed circuit board 640 may be disposed in a space inside the housing 100*a*.

A first guide 130 being protruded more upward than other regions may be disposed on an upper surface of the housing 100*a*. The first guide 130 may be disposed at the center of the upper surface portion 102. The first guide 130 has a plate shape and can be coupled with a body 310, which will be described later.

First coupling grooves 150 for coupling with the plate 400 may be disposed on an upper surface and a lower surface of the housing 100*a*, respectively. Two each of the first coupling grooves 150 may be disposed on an upper surface portion 102 of the housing 100*a*, and two each thereof may be disposed on a lower surface of the housing 100*a*. For example, the two each of the first coupling grooves 150 being disposed on the upper surface portion 102 may be respectively disposed to be spaced apart from each other on both sides with respect to the first guide 130.

The first coupling groove 150 has a shape being recessed more downward than other regions from the upper surface portion 102 of the housing 100*a*, and a third coupling portion 410 of the plate 400, which will be described later, may be coupled thereto. A protrusion 152 being protruded from the bottom surface may be formed on the bottom of the first coupling groove 150. A portion of the outer surface of the protrusions 152 may be an inclined surface.

The camera device 10 may include the fixed part 200. The fixed part 200 may be called a bracket 200 in that it fixes the camera device 10 to the installation region.

The fixed part 200 may be coupled with the moving part 100. The fixed part 200 may be coupled to the rear surface of the moving part 100. The moving part 100 may be tiltably coupled to the fixed part 200.

The fixed part 200 may include a rear surface portion 202 being coupled to a rear surface of the moving part 100 and a plurality of side surface portions 204 being bent and extended forward from both ends of the rear surface portion 202 and forming a side surface. A second coupling portion 220 may be disposed at an end of the side portion 204 being extended forward. The second coupling portion 220 may be disposed to face the first coupling portion 140. The second coupling portion 220 may include a second coupling hole 222. The second coupling hole 222 may be disposed to face the first coupling hole 142.

The camera device 10 is coupled to the first coupling hole 142 and the second coupling hole 222, and may include a coupling shaft 500 that forms the center of rotation of the moving part 100. The coupling shaft 500 may be fitted on an outside of the second coupling portion 220 so that at least a portion thereof penetrates the second coupling hole 222 and the first coupling hole 142. The moving part 100 may rotate (tilt) clockwise or counterclockwise about the coupling shaft 500 through a control part 300, which will be described later. The coupling shaft 500 may include a screw.

The fixed part 200 may be screw-coupled to an installation region of the camera device 10. To this end, on an outer surface of the fixed part 200, a coupling portion including at least one screw hole may be disposed.

A connector hole 270 penetrating from a front surface to a rear surface may be disposed on the rear surface portion 202 of the fixed part 200. The connector hole 270 is for a connector (not shown) to penetrate through, one end of the connector is coupled to the printed circuit boards 630 and 640, and the other end penetrates the connector hole 270, so that it may be disposed to be protruded more rearward than the rear surface of the fixed part 200. The connector hole 270 may be provided in plural numbers corresponding to the number of connectors. For example, the connector and the connector hole 270 may be provided in pairs corresponding to the number of lenses 110 and 120.

The connector hole 270 may be a long hole whose lengthwise direction is formed in an up and down direction. Accordingly, the connector may move within the connector hole 270 when the moving part 100 moves.

At least one or more grooves may be formed on an outer surface of the fixed part 200. The groove may have a shape in which a portion of the outer surface of the fixed part 200 is recessed. The rigidity of the fixed part 200 can be reinforced through the groove.

A second guide 210 being protruded more upward than other regions may be disposed on an upper surface of the fixed part 200. The second guide 210 may be disposed to face the first guide 130 in an optical axis direction.

A hole 211 may be formed on an upper surface of the second guide 210. A control member 340, which will be described later, may be coupled to the hole 211.

The camera device 10 may include a plate 400. The plate 400 may be disposed between the moving part 100 and the fixed part 200. The plate 400 may be coupled to a rear surface of the moving part 100. The plate 400 may be made of metal. The plate 400 may be coupled so as to cover the rear surface of the space inside the moving part 100. Accordingly, the printed circuit boards 630 and 640 may be disposed between the plate 400 and a space inside the moving part 100.

The plate 400 may include a penetrating hole (not shown) through which the connector penetrates. The penetrating hole may be formed to penetrate from a front surface to a rear surface of the plate 400.

A concave portion (not shown) may be formed on a rear surface of the plate 400 in a shape being recessed more forward than other regions. The concave portion (not shown) may have a groove shape. The concave portion may be provided in plural and disposed to be spaced apart from each other. The concave portion may be a long groove having a predetermined length. The lengthwise direction of the concave portion may be defined as the left and right direction connecting both side surfaces of the plate 400. The rigidity of the plate 400 can be reinforced through the concave portion.

The plate 400 may include a third coupling portion 410. The third coupling portion 410 may have a shape in which a portion of an edge of the plate 400 is bent forward and extended. The third coupling part 410 may be coupled to the moving part 100. The third coupling portion 410 may be coupled to the first coupling groove 150. The third coupling portion 410 may be provided in plural numbers corresponding to the number of first coupling grooves 150. For example, two each of the third coupling portions 410 may be disposed to be spaced apart from each other at an upper end of the plate 400, and two each of them may be disposed to be spaced apart from each other at a lower end of the plate 400.

The third coupling portion 410 includes a third coupling hole 412, and the third coupling hole 412 may be coupled to the protrusion 152. In other words, the plate 400 and the moving part 100 may be hook-coupled through the third coupling hole 412 and the protrusion 152.

The camera device 10 may include a control part 300. The control part 300 is for adjusting the angle of view of the camera device 10 and can move the moving part 100.

The control part 300 may include an elastic member 360, a control member 340, and a body 310.

The elastic member 360 may be disposed between the first guide 130 and the second guide 210. The rear surface of the elastic member 360 is in contact with the front surface of the second guide 210, and the front surface of the elastic member 360 may be in contact with the rear surface of the first guide 130.

The elastic member 360 is made of a metal material and can provide elastic force between the fixed part 100 and the moving part 200. The elastic member 360 may include a leaf spring.

In detail, the elastic member 360 may include a first region 362 and a second region 364. One end of the first region 362 and the second region 364 are coupled to connect each other and the other end may be spaced apart from each other. In contrast, the first region 362 and the second region 364 may be formed such that both ends are in contact with each other and only the central region is spaced apart from each other. The first region 362 may be a portion including a region in contact with the first guide 130, and the second region 364 may be a portion including a region in contact with the second guide 210.

That is, the central regions of the first region 362 and the second region 364 are spaced apart from each other in an up and down direction, and elastic deformation may occur in a direction perpendicular to the direction of movement of the body 310. The first region 362 and the second region 364 may become closer to or move away from each other depending on the movement of the body 310. More specifically, when the gap between the base 312 of the body 310, which will be described later, and the fixed part 200 becomes smaller, the gap between the first region 362 and the second region 364 may become smaller. In addition, when the gap between the base 312 and the fixed part 200 becomes distant, the gap between the first region 362 and the second region 364 may become distant.

Whenever the gap between the first region 362 and the second region 364 approaches, each of the front surface of the first region 362 and the rear surface of the second region 364 may provide elastic force in a direction pressing the moving part 100 and the fixed part 200.

In addition, the gap between the plate 400 and the fixed part 200 may be adjusted by the gap between the first region 361 and the second region 362 of the elastic member 360.

The body 310 may be coupled to an upper portion of the moving part 100 and the fixed part 200. At least a portion of the body 310 may be in contact with the moving part 100, and another part may be in contact with the fixed part 200.

The body 310 may include a base 312, a first side wall 316 being extended from the base 312 and being in contact with the fixed part 200, and a second side wall 314 being extended from the base 312 and in contact with the moving part 100. The first side wall 316 is extended from a rear end of the base 312, and the second side wall 314 may be extend from a front end of the base 312. The first side wall 316 and the second side wall 314 may have a shape being protruded downward from a front end and a rear end of the base 312, respectively.

The angle formed by the base 312 and the first side wall 316 may be different from the angle formed by the base 312 and the second side wall 314. Unlike this, the angle formed by the base 312 and the first side wall 316 may be the same as the angle formed by the base 312 and the second side wall 314.

The first side wall 316 may be formed to be inclined so that the distance to a rear surface of the fixed part 200 increases as it moves downward. At this time, the angle formed by the first side wall 316 and the base 312 may be an obtuse angle.

The second side wall 314 may be formed to be inclined so that the distance to the front surface of the moving part 100 increases as it moves downward. At this time, the angle formed by the second side wall 314 and the base 312 may be an obtuse angle.

The moving direction of the body 310 may not be parallel to an optical axis of the lenses 110 and 120.

A hole into which the control member 340 is coupled by penetrating therethrough from an upper surface to a lower surface may be formed in the base 312. A screw thread or screw groove may be formed on an inner circumferential surface of the hole, and thus the control member 340 may be screw-coupled together.

The base 312 may be disposed to be overlapped with the second guide 210 in an up and down direction. The hole inside the base 312 may be disposed to face the hole 211 of the second guide 210 in an up and down direction.

The control member 340 may penetrate through the hole of the base 312 and be screw-coupled to the hole 211 of the second guide 210. The control member 340 may also be called a screw 340. The control member 340 may include a head portion and a fastening portion being protruded downward from a lower surface of the head and coupled to the hole 211. The camera device 10 may include a control unit (not shown) that controls the rotation of the control member 340. As the control member 340 rotates, the moving part 100 may be tilted against the fixed part 200.

The control unit is for controlling the rotation of the control member 340, and can move the body 310 in an up and down direction through the rotation of the control member 340. The control member 340 may be connected to a separate driving unit such as a step motor, and the control unit may control the rotation of the control member 340 through control of the step motor.

Of course, the control member 340 can be manually rotated by a user.

According to the above structure, when the gap between the base 312 of the body 310 and the fixed part 200 becomes smaller, the optical axes of the lenses 110 and 120 may be tilted in one direction from the reference point. In addition, the optical axes of the lenses 110 and 120 may be tilted from the reference point to the other direction when the gap between the base 312 of the body 310 and the fixed part 200 increases.

Here, the reference point may be a region where the optical axes of the lenses 110 and 120 are initially set during the assembly process of the camera device 10.

Accordingly, the optical axis of the lens 110 or 120 may be tilted in one direction or the other direction from the reference point when the body 310 moves in a direction perpendicular to the optical axis of the lens 110 or 120. With respect to the reference point, the lenses 110 and 120 may have a rotation angle of 20 degrees in one direction or the other direction. This takes into account the gap between the fixed part 200 and the plate 400, and this is in consideration of the deformation of the components inside the camera device 10 when the moving part rotates beyond the set range and that the space inside the camera device 10 is excessively open.

With reference to FIG. 4, the body 310 moves downward when the control member 340 is rotated in one direction by the control unit, and the moving part 100 including the lenses 110 and 120 may be moved in a first direction A by the contact between the first side wall 316 and the fixed part 200 and the contact between the second side wall 314 and the moving part 100. This can be understood as the optical axes of the lenses 110 and 120 are tilted upward when the body 310 moves downward.

And, the gap between the first guide 130 and the second guide 210 may become smaller when the body 310 moves downward, and accordingly, the gap between the first region 362 and the second region 364 of the elastic member 360 may become smaller.

In addition, when the body 310 moves downward, the gap between the upper side of the plate 400 and the upper side of the fixed part 200 may become narrow, and the gap between the lower side of the plate 400 and the lower side of the fixed part 200 may become widened When the control member 340 is rotated in the other direction by the control unit, the body 310 moves upward, and due to a change in the contact area between the fixed part 200 and the first side wall 316 and a change in the contact area between the moving part 100 and the second side wall 314, the moving part 100 including the lenses 110 and 120 may be moved in a second direction B. This can be understood as the optical axes of the lenses 110 and 120 are tilted downward when the body 310 moves upward.

And, when the body 310 moves upward, the gap between the first guide 130 and the second guide 210 may become distant, and accordingly, a gap between the first region 362 and the second region 364 of the elastic member 360 may become distant.

In addition, when the body 310 moves upward, the gap between the upper side of the plate 400 and the upper side of the fixed part 200 may become distant, and the gap between the lower side of the plate 400 and the lower side of the fixed part 200 may be reduced.

Meanwhile, the gap between the first guide 130 and the second guide 210 may become distant due to the elastic force between the first region 362 and the second region 364 of the elastic member 360 when the body 310 moves upward.

Meanwhile, the camera device 10 may include a clip (not shown) that restricts the movement of the moving part 100, a portion of the clip is coupled to a lower surface of the moving part 100, and another portion may be coupled to a lower surface of the fixed part.

According to the above structure, it is possible to provide a camera device that can adjust the angle of view to a beam angle within a desired range.

In addition, it is possible to provide a camera device that can minimize changes in angle of view due to manufacturing tolerances of the camera module or tolerances that occur when mounted on a vehicle.

In addition, it is possible to provide a camera device that can minimize changes in angle of view caused by external forces or vibration during mounting process or after mounting on a vehicle.

In the above description, it is described that all the components constituting the embodiments of the present invention are combined or operated in one, but the present invention is not necessarily limited to these embodiments. In other words, within the scope of the present invention, all of the components may be selectively operated in combination with one or more. In addition, the terms "comprise", "include" or "having" described above mean that the corresponding component may be inherent unless specifically stated otherwise, and thus it should be construed that it does not exclude other components, but further include other components instead. All terms, including technical and scientific terms, have the same meaning as commonly understood by one of ordinary skill in the art unless otherwise defined. Terms used generally, such as terms defined in a dictionary, should be interpreted to coincide with the contextual meaning of the related art, and shall not be interpreted in an ideal or excessively formal sense unless explicitly defined in the present invention.

The above description is merely illustrative of the technical idea of the present invention, and those skilled in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A camera device comprising:
a moving part including a lens;
a fixed part coupled to the moving part; and
a control part configured to control the movement of the moving part,
wherein the control part includes a control member and a body,
wherein the body includes a base, a first side wall extended from the base and in contact with the fixed part, and a second side wall extended from the base and in contact with the moving part,
wherein the control part includes an elastic member disposed between the moving part and the fixed part,
wherein the elastic member includes a first region in contact with the moving part and a second region in contact with the fixed part, and
wherein the first region and the second region are at least partially separated from each other.

2. The camera device according to claim 1,
wherein when a gap between the base of the body and the fixed part becomes smaller, a gap between the first region and the second region of the elastic member becomes smaller.

3. The camera device according to claim 1,
wherein a gap between the moving part and the fixed part is adjusted by a gap between the first region and the second region of the elastic member.

4. The camera device according to claim 1, including:
an image sensor arranged in alignment with an optical axis of the lens
wherein the image sensor is disposed within the moving part.

5. The camera device according to claim 1,
wherein the lens includes a first lens and a second lens arranged to be stepped from each other on a front surface of the moving part.

6. The camera device according to claim 1, including:
a motor that rotates the control part.

7. A camera device comprising:

a moving part including a lens;

a fixed part coupled to the moving part; and a control part configured to control the movement of the moving part, wherein the control part includes a control member and a body, wherein the body includes a base, a first side wall extended from the base and in contact with the fixed part, and a second side wall extended from the base and in contact with the moving part, wherein the base includes a first hole into which the control member is inserted, and wherein the fixed part includes a second hole into which the control member is inserted.

8. The camera device according to claim 1, wherein each of an angle formed by the base and the first side wall and an angle formed by the base and the second side wall is an obtuse angle.

9. The camera device according to claim 1, wherein when a gap between the base of the body and the fixed part becomes smaller, an optical axis of the lens is tilted to one direction from a reference point.

10. The camera device according to claim 1, wherein when a gap between the base of the body and the fixed part increases, an optical axis of the lens is tilted from a reference point to the other direction.

11. The camera device according to claim 1, including:

a control unit that controls the control part.

12. A camera device comprising:

a moving part including a lens;

a fixed part coupled with the moving part; and a control part that adjusts movement of the moving part, wherein the control part includes an elastic member and a body, and wherein an optical axis of the lens is tilted in one direction or an other direction from a reference point when the body moves in a direction perpendicular to the optical axis of the lens, wherein the control part includes an elastic member disposed between the moving part and the fixed part, wherein the elastic member includes a first region in contact with the moving part and a second region in contact with the fixed part, and wherein the first region and the second region are at least partially separated from each other.

13. The camera device according to claim 12, wherein the body includes a base, a first side wall extended from the base and in contact with the fixed part; and a second side wall extended from the base and in contact with the moving part.

14. The camera device according to claim 12, wherein when a gap between the base of the body and the fixed part becomes smaller, a gap between the first region and the second region of the elastic member becomes smaller.

15. The camera device according to claim 12, wherein a gap between the moving part and the fixed part is adjusted by a gap between the first region and the second region of the elastic member.

16. A camera device comprising:

a moving part including a lens;

a fixed part coupled to the moving part; and a control part configured to control the movement of the moving part, wherein the control part includes a control member and a body, wherein the body includes a base, a first side wall extended from the base and in contact with the fixed part, and a second side wall extended from the base and in contact with the moving part, wherein a first guide is disposed on an upper surface of the moving part, wherein a second guide is disposed on an upper surface of the fixed part, wherein the first side wall is in contact with the second guide, and wherein the second side wall is in contact with the first guide.

17. A camera device comprising:

a moving part including a lens;

a fixed part coupled to the moving part; and a control part configured to control the movement of the moving part, wherein the control part includes a control member and a body, wherein the body includes a base, a first side wall extended from the base and in contact with the fixed part, and a second side wall extended from the base and in contact with the moving part, wherein a first coupling part is disposed on a side of the moving part, wherein a second coupling part is disposed on a side of the fixing part, and wherein a coupling shaft is coupled to the first coupling part and the second coupling part, and forms a rotation center of the moving part.

18. A camera device comprising:

a moving part including a lens;

a fixed part coupled to the moving part; and a control part configured to control the movement of the moving part, wherein the control part includes a control member and a body, wherein the body includes a base, a first side wall extended from the base and in contact with the fixed part, and a second side wall extended from the base and in contact with the moving part, wherein a connector protrudes toward a rear of the moving part, wherein a connector hole through which the connector passes is disposed in the fixing part, and wherein the connector hole is a long hole having a longitudinal direction in a vertical direction.

* * * * *